US009161526B2

(12) United States Patent
Nipper

(10) Patent No.: US 9,161,526 B2
(45) Date of Patent: Oct. 20, 2015

(54) TELESCOPING BOOM HOIST SYSTEM

(71) Applicant: Jerry Lynn Nipper, Rockport, AR (US)

(72) Inventor: Jerry Lynn Nipper, Rockport, AR (US)

(*) Notice: Subject to any disclaimer, the term of this patent is extended or adjusted under 35 U.S.C. 154(b) by 150 days.

(21) Appl. No.: 13/941,810

(22) Filed: Jul. 15, 2013

(65) Prior Publication Data

US 2014/0264213 A1 Sep. 18, 2014

Related U.S. Application Data

(60) Provisional application No. 61/777,998, filed on Mar. 12, 2013.

(51) Int. Cl.
 B66C 23/04 (2006.01)
 A01M 31/02 (2006.01)
 B66C 23/20 (2006.01)

(52) U.S. Cl.
 CPC .............. *A01M 31/02* (2013.01); *B66C 23/203* (2013.01)

(58) Field of Classification Search
 CPC ......... A01M 31/02; A22B 5/06; F16M 13/02; B66C 23/44
 USPC .......... 254/335–338, 380; 212/347–350, 294, 212/299, 300
 See application file for complete search history.

(56) References Cited

U.S. PATENT DOCUMENTS

| | | | | | |
|---|---|---|---|---|---|
| 315,109 | A | * | 4/1885 | Ball | 212/177 |
| 857,430 | A | * | 6/1907 | Youngquist et al. | 182/134 |
| 980,846 | A | * | 1/1911 | Sochor | 212/299 |
| 1,264,357 | A | * | 4/1918 | Willmer | 254/262 |
| 2,807,374 | A | * | 9/1957 | McLean | 212/274 |
| 2,867,333 | A | * | 1/1959 | De Shano | 212/177 |
| 3,066,804 | A | * | 12/1962 | McCrossen | 212/348 |
| 3,300,061 | A | * | 1/1967 | Bamford | 212/296 |
| 3,432,145 | A | * | 3/1969 | Mudge | 254/337 |
| 3,516,554 | A | * | 6/1970 | Nakamura | 212/348 |
| 3,568,797 | A | * | 3/1971 | Hardy | 182/142 |
| 3,759,399 | A | * | 9/1973 | Glass et al. | 212/180 |
| 3,800,965 | A | * | 4/1974 | Barron et al. | 414/787 |
| 4,225,013 | A | * | 9/1980 | Sample | 182/134 |
| 4,493,395 | A | * | 1/1985 | Rittenhouse | 182/187 |
| 4,969,625 | A | * | 11/1990 | Singer et al. | 248/662 |
| 5,016,733 | A | * | 5/1991 | Bradley | 182/187 |
| 5,028,194 | A | * | 7/1991 | Robinson | 414/139.6 |
| 5,117,942 | A | * | 6/1992 | Tzavaras | 182/142 |
| 5,199,527 | A | * | 4/1993 | Jennings | 182/187 |
| 5,205,375 | A | * | 4/1993 | Shriver | 182/187 |
| 5,263,675 | A | * | 11/1993 | Roberts et al. | 248/219.4 |
| 5,316,104 | A | * | 5/1994 | Amacker | 182/187 |
| 5,332,063 | A | * | 7/1994 | Amacker | 182/116 |
| 5,431,526 | A | * | 7/1995 | Peterson et al. | 414/543 |

(Continued)

*Primary Examiner* — Emmanuel M Marcelo
*Assistant Examiner* — Michael Gallion

(57) ABSTRACT

A telescoping boom hoist system is a tree mounted system that provides a hunter with a facilitated means of raising and installing a tree stand. The telescoping boom hoist system is provided with a collapsible design that allows for facilitated transport and handling. The apparatus utilizes a telescopic boom and a frame assembly. The frame assembly provides a stable base for the apparatus. The telescopic boom is coupled to an axle member of the frame assembly, permitting the telescopic boom to pivot. The telescopic boom utilizes a plurality of guide rings that function as pulley or hoist anchor points. The telescoping boom extends the positioning of the guide rings in order to prevent interference while hoisting a tree stand. After installing the tree stand, the telescoping boom hoist system provides a means of safely raising a plurality of hunting equipment to the mounted tree stand.

15 Claims, 10 Drawing Sheets

(56) References Cited

U.S. PATENT DOCUMENTS

| | | | | |
|---|---|---|---|---|
| 5,435,412 A | * | 7/1995 | Franklin et al. | 182/188 |
| 5,588,907 A | * | 12/1996 | DePietro et al. | 452/187 |
| 5,607,143 A | * | 3/1997 | Regal | 254/342 |
| 5,632,461 A | * | 5/1997 | von Helms et al. | 248/218.4 |
| 5,685,393 A | * | 11/1997 | Early | 182/133 |
| 5,820,455 A | * | 10/1998 | Breedlove | 452/187 |
| 5,971,363 A | * | 10/1999 | Good | 254/323 |
| 6,045,442 A | * | 4/2000 | Bounds | 452/187 |
| 6,059,240 A | * | 5/2000 | Gorsuch | 248/219.4 |
| 6,202,868 B1 | * | 3/2001 | Murray | 212/294 |
| 6,202,964 B1 | * | 3/2001 | Thornhill | 248/219.4 |
| 6,250,483 B1 | * | 6/2001 | Frommer | 212/180 |
| 6,663,065 B1 | * | 12/2003 | Whittenburg | 248/219.1 |
| 6,695,688 B1 | * | 2/2004 | Owen et al. | 452/187 |
| 6,708,832 B1 | * | 3/2004 | Hannon | 211/107 |
| 6,726,163 B2 | * | 4/2004 | Eppard et al. | 248/219.4 |
| 6,739,964 B2 | * | 5/2004 | Gearhart | 452/187 |
| 7,086,433 B1 | * | 8/2006 | Serman | 144/34.1 |
| 7,168,522 B1 | * | 1/2007 | Price | 182/141 |
| 7,174,995 B1 | * | 2/2007 | Alexander | 182/187 |
| 7,191,732 B2 | * | 3/2007 | Neal, Jr. | 119/57.91 |
| 7,226,040 B2 | * | 6/2007 | Keister | 254/324 |
| 7,314,406 B2 | * | 1/2008 | Bilinovich | 452/185 |
| 7,341,507 B1 | * | 3/2008 | Julian, Sr. | 452/192 |
| 7,350,769 B1 | * | 4/2008 | Dorzok | 254/261 |
| 7,458,563 B1 | * | 12/2008 | Liu | 254/334 |
| 7,476,149 B2 | * | 1/2009 | Burrows | 452/187 |
| 7,544,120 B1 | * | 6/2009 | Tardif et al. | 452/187 |
| 7,604,450 B1 | * | 10/2009 | Calvery | 414/462 |
| 7,882,931 B2 | * | 2/2011 | D'Acquisto | 182/187 |
| 7,913,980 B1 | * | 3/2011 | Cipriano | 254/393 |
| 7,963,368 B2 | * | 6/2011 | Scudera et al. | 182/116 |
| 8,062,106 B1 | * | 11/2011 | Adams, III | 452/189 |
| 8,511,433 B2 | * | 8/2013 | Place | 182/133 |
| 8,683,909 B1 | * | 4/2014 | Copus | 89/37.04 |
| 8,684,138 B1 | * | 4/2014 | Marsh, II | 182/116 |
| D718,410 S | * | 11/2014 | Woller | D22/199 |
| 8,915,774 B1 | * | 12/2014 | Hunter | 452/187 |
| 2003/0228838 A1 | * | 12/2003 | Gearhart | 452/187 |
| 2007/0017744 A1 | * | 1/2007 | Jacks | 182/187 |
| 2008/0085669 A1 | * | 4/2008 | Burrows | 452/187 |
| 2009/0272709 A1 | * | 11/2009 | Nessner et al. | 212/270 |
| 2009/0308994 A1 | * | 12/2009 | Moore | 248/229.17 |
| 2011/0049315 A1 | * | 3/2011 | Buckbee | 248/219.4 |
| 2011/0127477 A1 | * | 6/2011 | Kokolis | 254/285 |
| 2011/0260127 A1 | * | 10/2011 | Surgeon et al. | 254/362 |
| 2012/0007029 A1 | * | 1/2012 | Place | 254/1 |
| 2013/0001385 A1 | * | 1/2013 | Green | 248/218.4 |
| 2013/0089405 A1 | * | 4/2013 | Wigant et al. | 414/803 |
| 2014/0311828 A1 | * | 10/2014 | Bassett et al. | 182/124 |
| 2015/0014266 A1 | * | 1/2015 | Rafailovic et al. | 212/176 |

* cited by examiner

TELESCOPING BOOM HOIST SYSTEM

The current application claims a priority to the U.S. Provisional Patent application Ser. No. 61/777,998 filed on Mar. 12, 2013.

FIELD OF THE INVENTION

The present invention relates generally to a tree mounted hoist system, more specifically to a tree mounted hoist system that utilizes a telescoping boom in order to raise a tree mounted platforms or other equipment up the side of a tree.

BACKGROUND OF THE INVENTION

Throughout history, humankind has relied on hunting as a primary food source. Indeed, even in today's world, there are regions where hunting is the primary method of putting food on the table. Many modernized countries posses privately owned large farms and animal ranches which provide all the protein necessary to its citizens. The meat produced by animals on farms can often be found in grocery stores either as meat or in a myriad of other processed products. In many cases, processed foods make maximum use of the animal's body, and as a result, a large number of processed foods can be found in modernized countries' grocery stores.

Despite the prevalence of grocery store available meats, hunting still persists as a way to obtain protein, even in modernized countries such as the United States. In some regions of the US and in other parts of the world, hunting is the only way for a person to obtain the protein the need to survive. Hunting is practiced even in regions where hunting is not necessary to obtain protein. As a result of this, hunting is been maintained as a practiced skill and passed down through the generations. There are many different methods that are performed when hunting however all modern hunting methods involve the use of either a firearm or a bow and arrow to deliver the killing blow to the animal from a safe distance.

There are two primary practices that are followed when hunting a land animal such as a deer. The first practice is stalking. Stalking is the art of moving silently and unseen, attempting to move into a position where the animal can be spotted, and a clear shot with either gun or bow can be taken in an attempt to kill the animal. This practice is sometimes essential if a hunter to be successful, however stalking is an extremely difficult art to master as most animals have sensory perception that exceeds that of humans. For example deer, which are commonly hunted in many parts of the US, have exceptional hearing. This makes it extremely difficult for a hunter to make moves without the deer hearing them when they are in close proximity to the deer. The other practice, which is much more prevalent in modern day hunting is the use of a tree stand. The tree stand effectively raises the hunter off of the ground, affording them with a much greater view of the surrounding area and allowing them in some cases to see over foliage and brush which could otherwise block a shot. The use of a tree stand often requires a great amount of patience as the tree stand method of hunting relies on the animals coming within range of the hunter such that the hunter may take shots at the animal using either a firearm or bow. Tree stands are a fairly effective tool in aiding the hunter. However, tree stands must first be place in the tree before they can be used. Placing a tree stand in a tree can be a difficult process involving one or more trips up a ladder which is leaned up against the tree. It is often quite difficult for the hunter to get the tree stand up the ladder and into the correct position to be attached to the tree. Getting the tree stand into the correct position on the tree can be both time consuming and frustrating for the hunter. It is clear that there is a need for a device which simplifies the process of getting a tree stand into a tree.

It is therefore the object of the present invention to provide a tree mounted telescoping boom hoist system that provides a hunter with a facilitated means of raising and installing a tree stand. The telescoping boom hoist system is provided in a collapsible design that allows for facilitated transport and handling. The telescoping boom hoist system utilizes a telescoping boom and a plurality of hoist mounts in order to stabilize and facilitate the raising of a tree stand for installation. After installing the tree stand, the telescoping boom hoist system provides a means of safely raising a plurality of hunting equipment to the mounted tree stand. The telescoping boom extends the positioning of the hoist mount in order to limit interference while hoisting a plurality of hunting equipment. The telescoping boom hoist system is intended to be of a lightweight and durable construction.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

Figure 1:
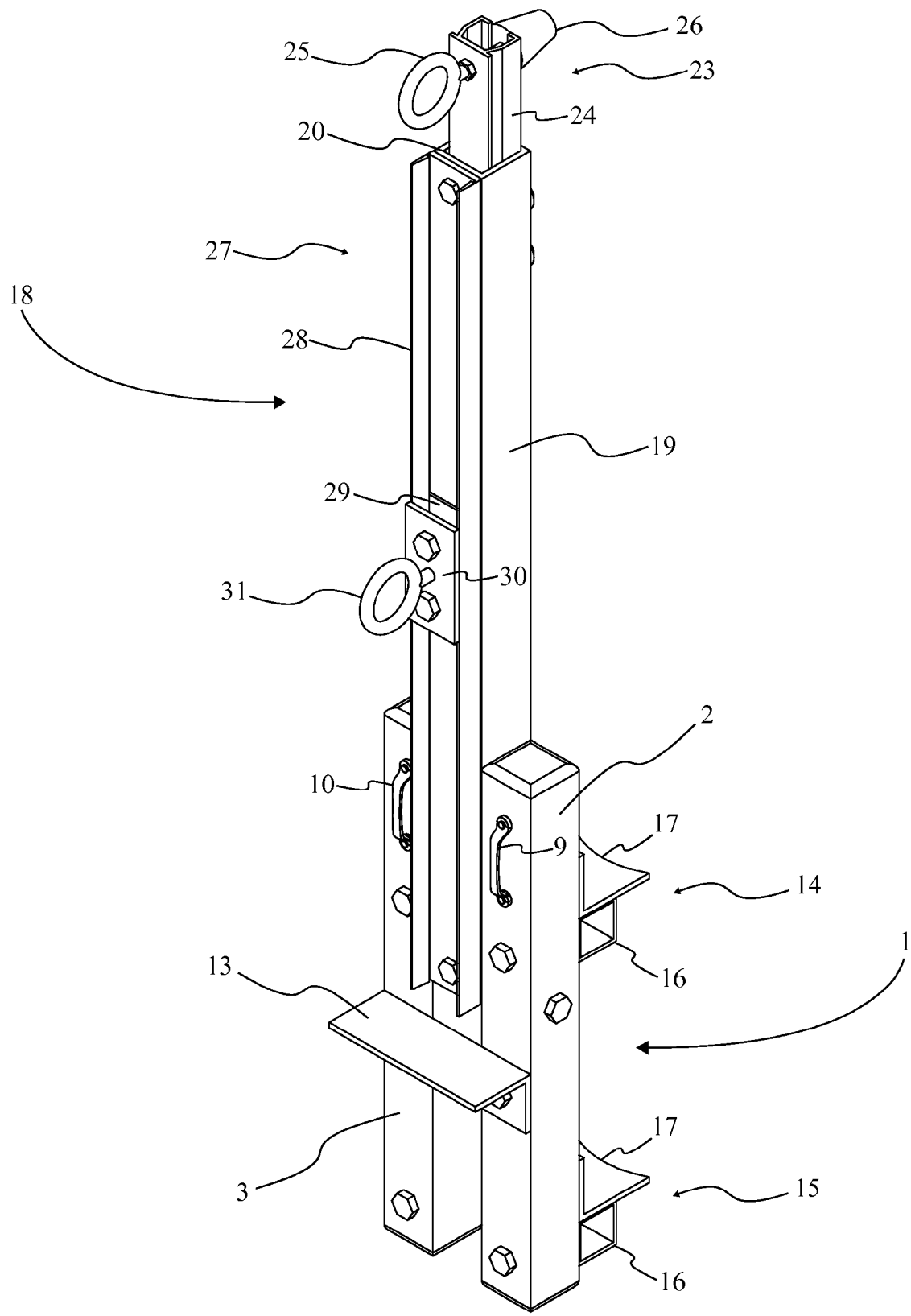
FIG. 1 is a front perspective view displaying the telescoping boom hoist system in the collapsed configuration, as per the current embodiment of the present invention.
Figure 2:
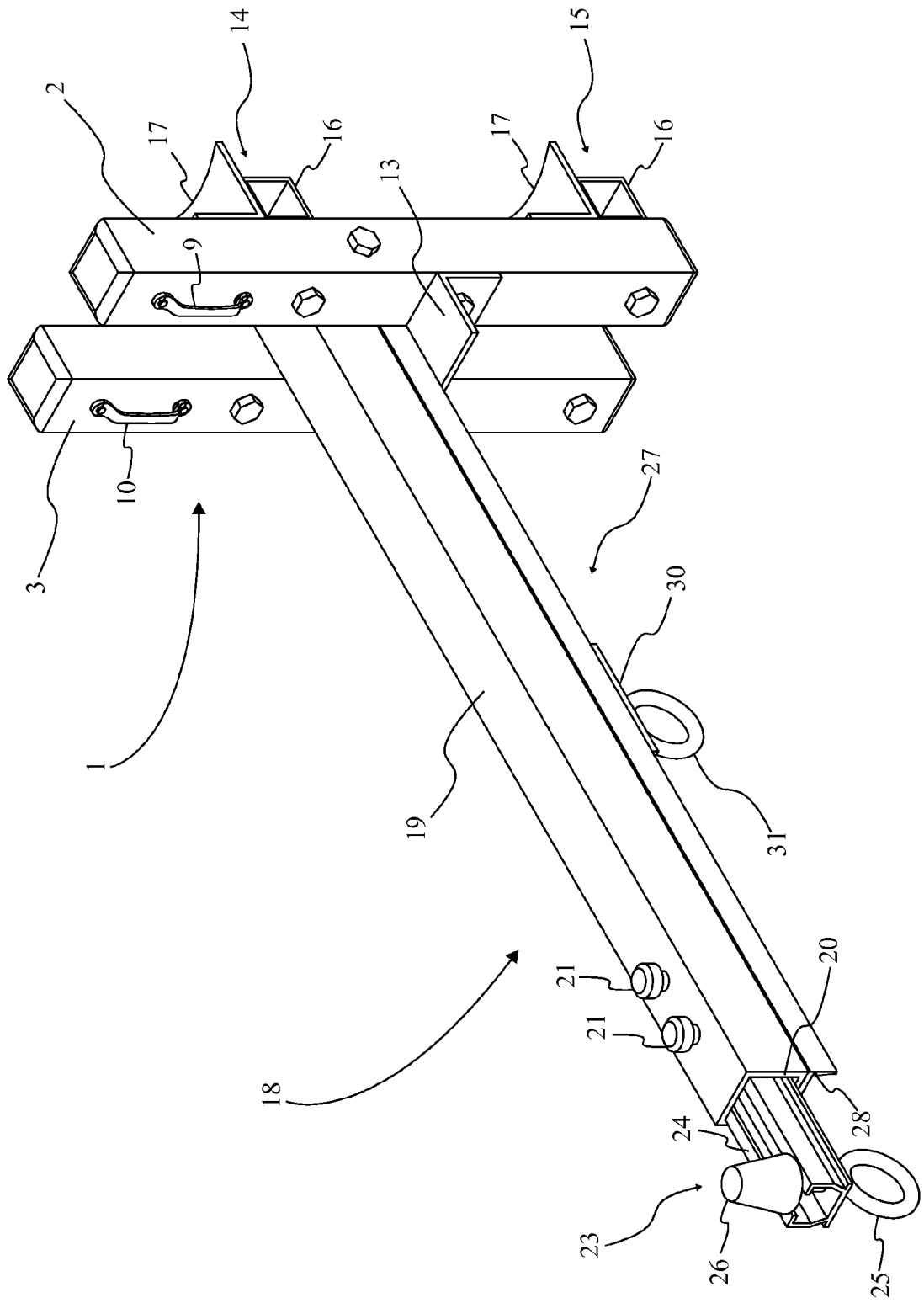
FIG. 2 is a front perspective view displaying the telescoping boom hoist system arranged in use as per the current embodiment of the present invention.
Figure 3:
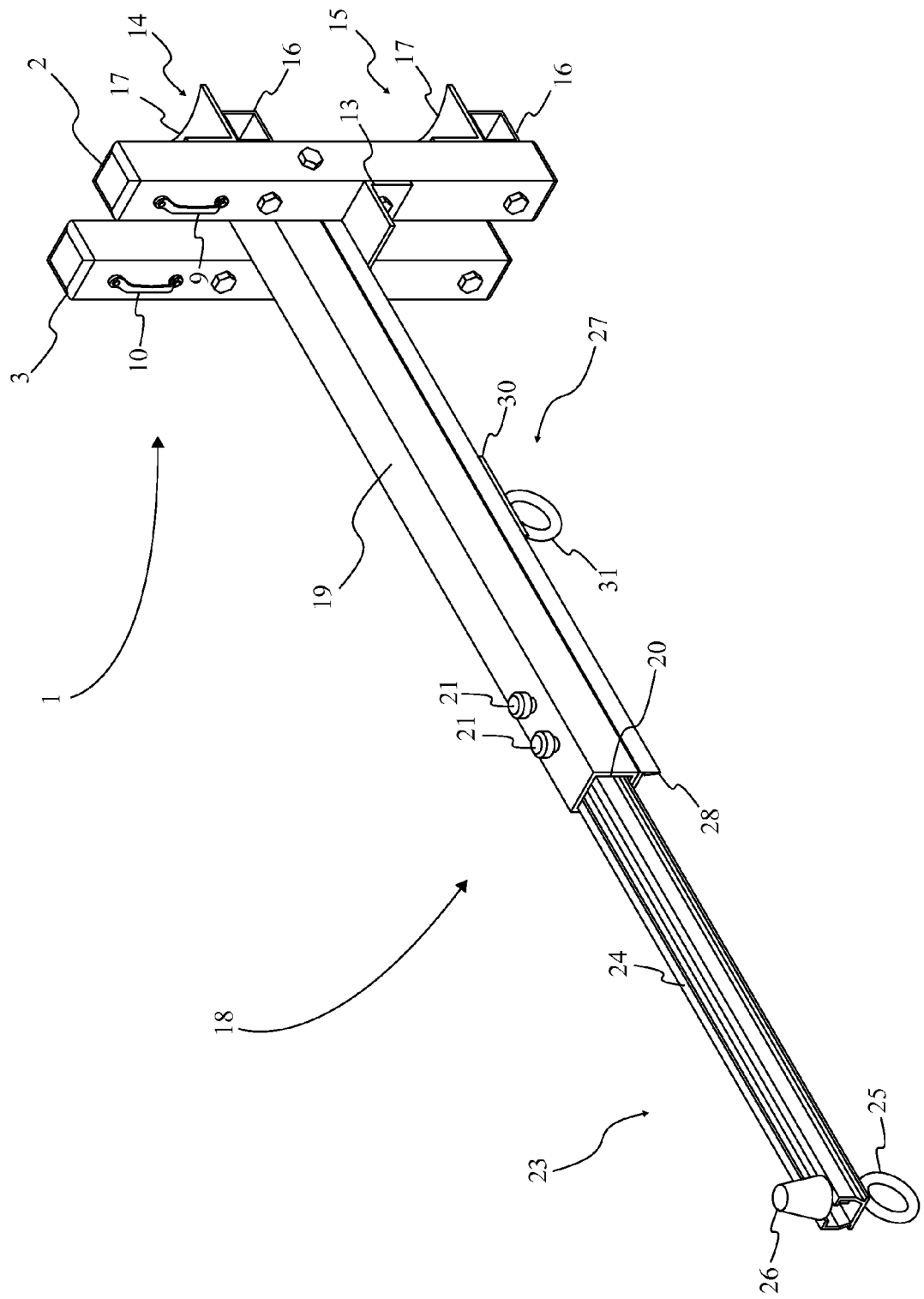
FIG. 3 is a front perspective view displaying the telescoping boom hoist system arranged in use, with the extended section protruding forward from the extension shaft as per the current embodiment of the present invention.

Referencing FIG. 1 and FIG. 2, the present invention is a telescoping boom hoist system that provides a hunter with a facilitated means of raising and installing a tree stand. The telescoping boom hoist system comprises a frame assembly 1 and a telescopic boom 18. The frame assembly 1 functions as a structural unit that secures the present invention to the side of a tree. The frame assembly 1 contains a particular component distribution that is optimally suited for having the telescopic boom 18 pivotally attached. The telescopic boom 18 is provided as an extendable component that pivots about an engagement with the frame assembly 1. The telescopic boom 18 enables the present invention to extend and collapse providing improved positioning during use and a compact and manageable conformation while being transported or mounted. In the current embodiment of the present invention, the telescopic boom 18 is pivotally coupled to the frame assembly 1.

Referencing FIGS. 1-4, the frame assembly 1 is provided as the structural unit that secures the telescoping boom hoist system to a tree and functions as an engagement point for the telescopic boom 18. In the current embodiment of the present invention, the frame assembly 1 comprises a first support 2, a second support 3, at least one strap assembly 8, an axle 12, a base plate 13, a first anchor assembly 14, and a second anchor assembly 15. The first support 2 and the second support 3 are provided as structurally similar components that cooperatively interact to provide a secure engagement with the telescopic boom 18. The first support 2 and the second support 3 function as parallel positioned support beam 16s that are symmetrically distributed to the frame assembly 1. The at least one strap assembly 8 is provided as the component system that detachably binds the frame assembly 1 to the trunk of a tree. The axle 12 functions as the axis of rotation and the mounting point for the telescopic boom 18. The base plate 13 functions as a cross beam that provides improved rigidity to the frame assembly 1. The base plate 13 additionally functions as a base beam which is pivotally engaged by the telescopic boom 18. The first anchor assembly 14 and the second anchor assembly 15 are provided as structurally similar components that provide a gripping surface that engages the side of the tree as well as functioning as cross beams that improve the rigidity of the frame assembly 1. The first anchor assembly 14 additionally functions as a base beam which is pivotally engaged by the telescopic boom 18. In the current embodiment of the present invention, the first support 2 is found juxtaposed parallel to the second support 3. The axle 12 is found positioned between the first support 2 and the second support 3. The axle 12 is perpendicularly engaged to the first support 2 and the second support 3.

Referencing FIGS. 3-6, the first support 2 and the second support 3 are symmetrically distributed components which provide an engagement or mounting to each of the components of the frame assembly 1. In the current embodiment of the present invention, the first support 2 and the second support 3 comprise a front section 4, a rear section 5, an upper region 6, and a lower region 7. The front section 4 is provided as the forward facing section of the present invention when mounted to a tree. The rear section 5 is provided as the section proximal to the tree face when the present invention is mounted to the tree. The upper region 6 and the lower region 7 are provided as vertical regions of the both the first support 2 and the second support 3. In the current embodiment of the present invention, the upper region 6 and the lower region 7 are separated by the positioning of the axle 12, wherein vertical positioning of the axle 12 relative to the first support 2 and the second support 3 marks the division between the upper region 6 and the lower region 7. The first anchor assembly 14 and the second anchor assembly 15 are found perpendicularly coupled to the rear section 5, wherein the first anchor assembly 14 and the second anchor assembly 15, both perpendicularly engage the first support 2 and the second support 3, on the rear section 5. The first anchor assembly 14 is securely attached to the upper region 6 of both the first support 2 and the second support 3, wherein the first anchor assembly 14 is specifically positioned on the upper region 6 of the first support 2 and the second support 3 coincident with the rear section 5. The second anchor assembly 15 is securely attached to the lower region 7 of both the first support 2 and the second support 3, wherein the second anchor assembly 15 is specifically positioned on the lower region 7 of the first support 2 and second support 3 coincident with the rear section 5. The base plate 13 is perpendicularly engaged to the front section 4, wherein the base plate 13 is a cross beam that is securely coupled to the first support 2 and the second support 3. The base plate 13 is positioned on the lower region 7 of front section 4 for both the first support 2 and the second support 3 and is found positioned adjacent to the axle 12. The at least one strap assembly 8 is found perpendicularly engaged to the first support 2 and the second support 3.

Referencing FIGS. 4-6 and FIG. 9, the at least one strap assembly 8 is provided as the component system that binds the frame assembly 1 to the trunk of a tree. In the current embodiment of the present invention, the at least one strap assembly 8 is found perpendicularly engaged with the front section 4 of the first support 2 and the second support 3. The at least one strap assembly 8 is found positioned on the upper region 6 of the first support 2 and the second support 3 coincident with the front section 4. In the current embodiment of the present invention, the at least one strap assembly 8 comprises a first strap guide 9, a second strap guide 10, and a strap 11. The first strap guide 9 and the second strap guide 10 are traversable structures that are positioned on the upper region 6 of the front section 4. The strap 11 is an elongated flexible component that is used to securely retain the first support 2 and the second support 3 to a tree. The first the first strap guide 9 is positioned on the first support 2 while the second strap guide 10 is positioned on the second support 3. The first strap guide 9 is found centrally aligned with the second strap guide 10, wherein first strap guide 9 and the second strap guide 10 are positioned on the first support 2 and the second support 3, respectively, with an alignment that permits a perpendicular arrangement for the strap 11.

Referencing FIG. 4 and FIGS. 7-9, the first anchor assembly 14 and the second anchor assembly 15 are provided as structurally similar components that function as cross beams that perpendicularly engage the first support 2 and the second support 3. Both the first anchor assembly 14 and the second anchor assembly 15 are found perpendicularly engaged to the first support 2 and the second support 3 and the rear section 5. In the current embodiment of the present invention, the first anchor assembly 14 and the second anchor assembly 15 each comprise a support beam 16 and a claw plate 17. The support beam 16 is provided as the structural element that provides the frame assembly 1 with a rigid and stable construction. The claw plate 17 is provided as the gripping element that engages the side of a tree. In the current embodiment of the present invention, the support beam 16 is found perpendicularly coupled to the first support 2 and the second support 3. The claw plate 17 is found peripherally coupled to the support beam 16, wherein the claw plate 17 is engaged to the exterior portion of the support beam 16. The claw plate 17 is found positioned perpendicular to the rear section 5, wherein the gripping portion of the claw plate 17 is directed towards the side of the tree orienting the claw plate 17 to be aligned perpendicular relative to the rear section 5.

Referencing FIGS. 1-4, the telescopic boom 18 is provided as a means of extending the range of an attachable hoist system, wherein the extended range provides the present invention with a facilitated means of raising differently sized hunting platforms up the side of a tree. The telescopic boom 18 is additionally provided with a means of pivoting into a compact state, which provides a facilitated means of initially mounting the telescoping boom hoist system as well as a mean of simplifying the storage aspect of the telescoping boom hoist system. In the current embodiment of the present invention, the telescopic boom 18 comprises a main section 19, an extended section 23 and an adjustable guide assembly 27. The main section 19 is provided as the component that retractably houses the extended section 23 and additionally functions as the mounting point for the adjustable guide assembly 27. The extended section 23 functions as the portion of the telescopic boom 18 which enables a first guide ring 25 to be extended away from the main section 19, allowing for the accommodation of larger sized structures to be hoisted up by the present invention. The adjustable guide assembly 27 is provided as the component allows variable positioning of a second guide ring 31 along the length of the main section 19.

Referencing FIGS. 1-6, the main section 19 function as the key component for the telescopic boom 18. The main section 19 provides an attachment point between the telescopic boom 18 and the frame assembly 1. The main section 19 additionally provides a mounting point and engagement means for the extended section 23 and the adjustable guide assembly 27. In the current embodiment of the present invention, the main section 19 comprises an extension shaft 20, a beam lock 21, and an axle mount 22. The extension shaft 20 is a channel that traverse into interior portion of the main section 19. The extension shaft 20 peripherally engages the extended section 23 and provides a means of retractably housing the extended section 23 within the main section 19. The beam lock 21 is provided as a means of securing the extended section 23 in order to achieve a particular length for positioning the first guide ring 25. The axle mount 22 is provided pivotal engagement means for coupling the telescopic boom 18 to the frame assembly 1.

Referencing FIGS. 1-6, the extended section 23 functions as the component that allows the first guide ring 25 to be positioned away from the main section 19 accommodating for larger sized structures to be raised along the side of the tree. In the current embodiment of the present invention, the extended section 23 comprises an elongated beam 24, a stopper 26, and the first guide ring 25. The elongated beam 24 provides a sturdy and rigid structure that is coupled to the stopper 26 and the first guide ring 25. The stopper 26 is provided as a means of preventing the elongated beam 24 from retracting into the extension shaft 20 further then intended. The stopper 26 additionally provides a means of hanging a plurality of items on the elongated beam 24 with less chance of said item sliding of the elongated beam 24. The first guide ring 25 functions as a mounting point for attaching a pulley or hoist assembly. In the current embodiment of the present invention, the first guide ring 25 and the stopper 26 are found terminally positioned on the elongated beam 24, wherein the first guide ring 25 and the stopper 26 are positioned on the terminal end of the elongated beam 24 that is furthest away from the axle mount 22. The first guide ring 25 is found positioned opposite the stopper 26 on the elongated body. The first guide ring 25 is found attached to the elongated beam 24 and the stopper 26, wherein the first guide ring 25 is secure to the elongated beam 24 through a fastener that traverses through the stopper 26 and across the elongated beam 24 in order to securely retain the first guide ring 25 and the fastener in place. The elongated beam 24 is extendably positioned within the extension shaft 20, wherein the extension shaft 20 sleeves the elongated beam 24 through complementary engagements peripherally positioned on the elongated beam 24 and longitudinally positioned within the extension shaft 20. The elongated beam 24 being selectively secured to the extensions shaft by way of the beam lock 21, wherein the beam lock 21 engages the elongated beam 24 within the extension shaft 20 in order to retain its longitudinal positioning.

Referencing FIGS. 1-4, the adjustable guide assembly 27 is provided as a means of adjusting the positioning of a second guide ring 31 along the length of the main section 19. The second guide ring 31 is provided as a functionally similar component to the first guide ring 25 that enables the mounting of a pulley or hoist anchor. The second guide ring 31 differs from the first guide ring 25 by being positoninable along the length of the main section 19 by way of the adjustable guide assembly 27. In the current embodiment of the present invention, the adjustable guide assembly 27 comprises a track 28, a slide mount 29, a slide fastener 30, and the second guide ring 31. The track 28 is provided as a traversable channel that spans the length of the main section 19. The slide mount 29 functions as the engaging component that traverse along the track 28. The slide fastener 30 is provided as the mean securing the slide mount 29 to a position along the track 28 as well as the means of coupling the second guide ring 31 to the slide mount 29. In the current embodiment of the present invention, the adjustable guide assembly 27 is found coupled longitudinally to the main section 19. The longitudinal coupling of the adjustable guide assembly 27 permits the track 28 to run parallel to the extension shaft 20. The slide mount 29 being moveably engaged to the track 28, wherein the moveable engagement permits the slide mount 29 to only traverse along the track 28. the second guide ring 31 is found attached to the slide mount 29 by way of the slide fastener 30, wherein the second guide ring 31 and the slide mount 29 are coupled but not coincident and are positioned oppositely to the slide fastener 30. The slide mount 29 is found immovably retained to the track 28 by way of the slide fastener 30, wherein the engagement of the slide fastener 30 and the slide mount 29 allows the slide fastener 30 to inhibit the slide mount 29 from moving along the length of the track 28.

Referencing FIGS. 1-4, in the current embodiment of the present invention, the telescopic boom 18 is found positioned between the first support 2 and the second support 3. The telescopic boom 18 is pivotably positioned between the first anchor assembly 14 and the base plate 13, wherein the telescopic boom 18 traverses an arcuate path about an axis allowing the telescopic boom 18 to be coincident with both the first anchor assembly 14 and the base plate 13. The main section 19 is pivotably coupled to the axle 12 by way of the axle mount 22, wherein the axle mount 22 provides the axle 12 a dedicated mounting point to function as an axis of rotation for the telescopic boom 18. The extension shaft 20 is founding traversing centrally into the main section 19, wherein the extension shaft 20 centrally traverses into the main section 19, longitudinally, at one end. The beam lock 21 is found positioned coincident with the extension shaft 20, wherein the beam lock 21 traverses the main section 19 into the extension shaft 20 in order to become coincident with the extended section 23.

Figure 7:
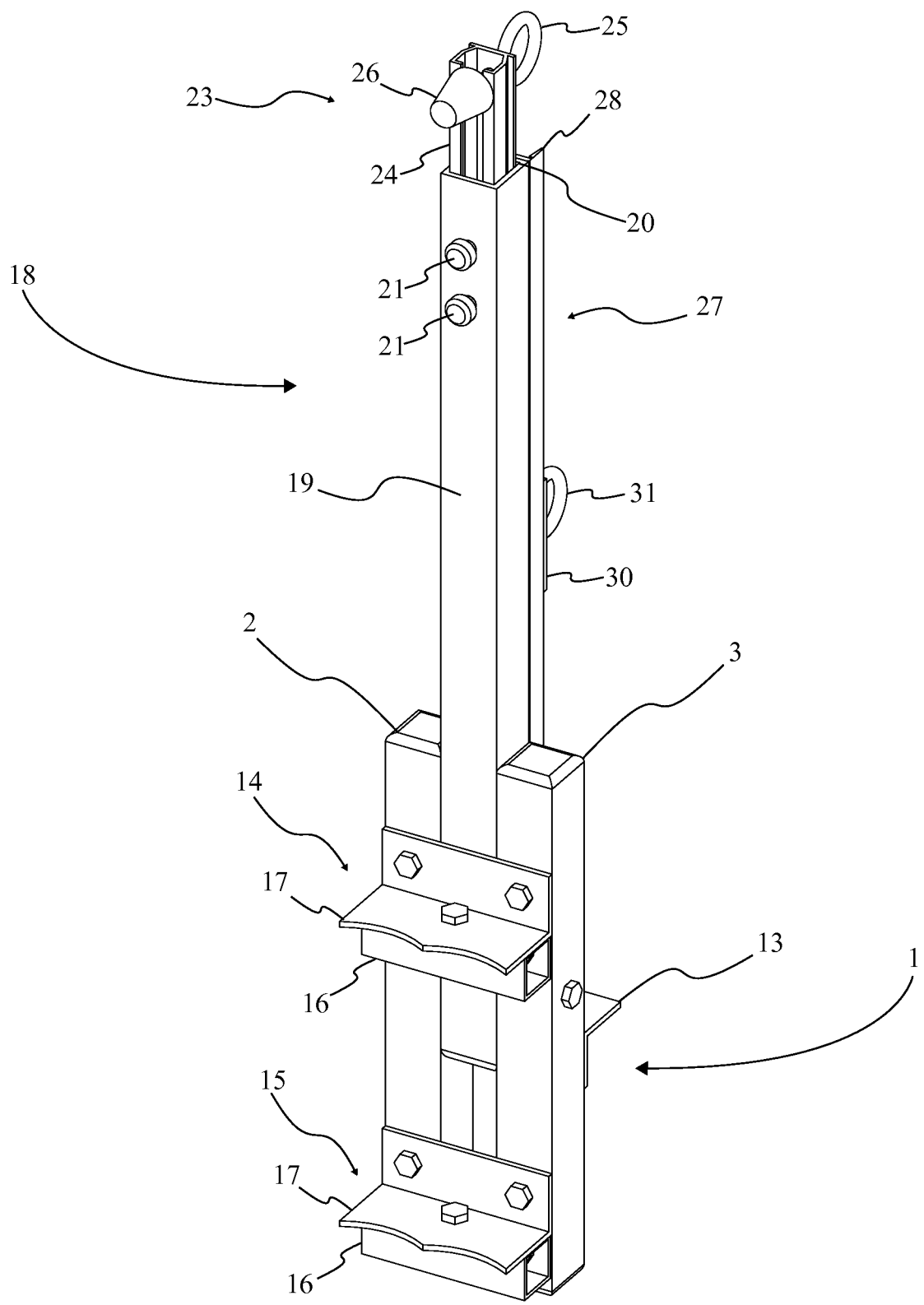
FIG. 7 is a rear perspective view displaying the telescoping boom hoist system in the collapsed configuration, as per the current embodiment of the present invention.
Figure 8:
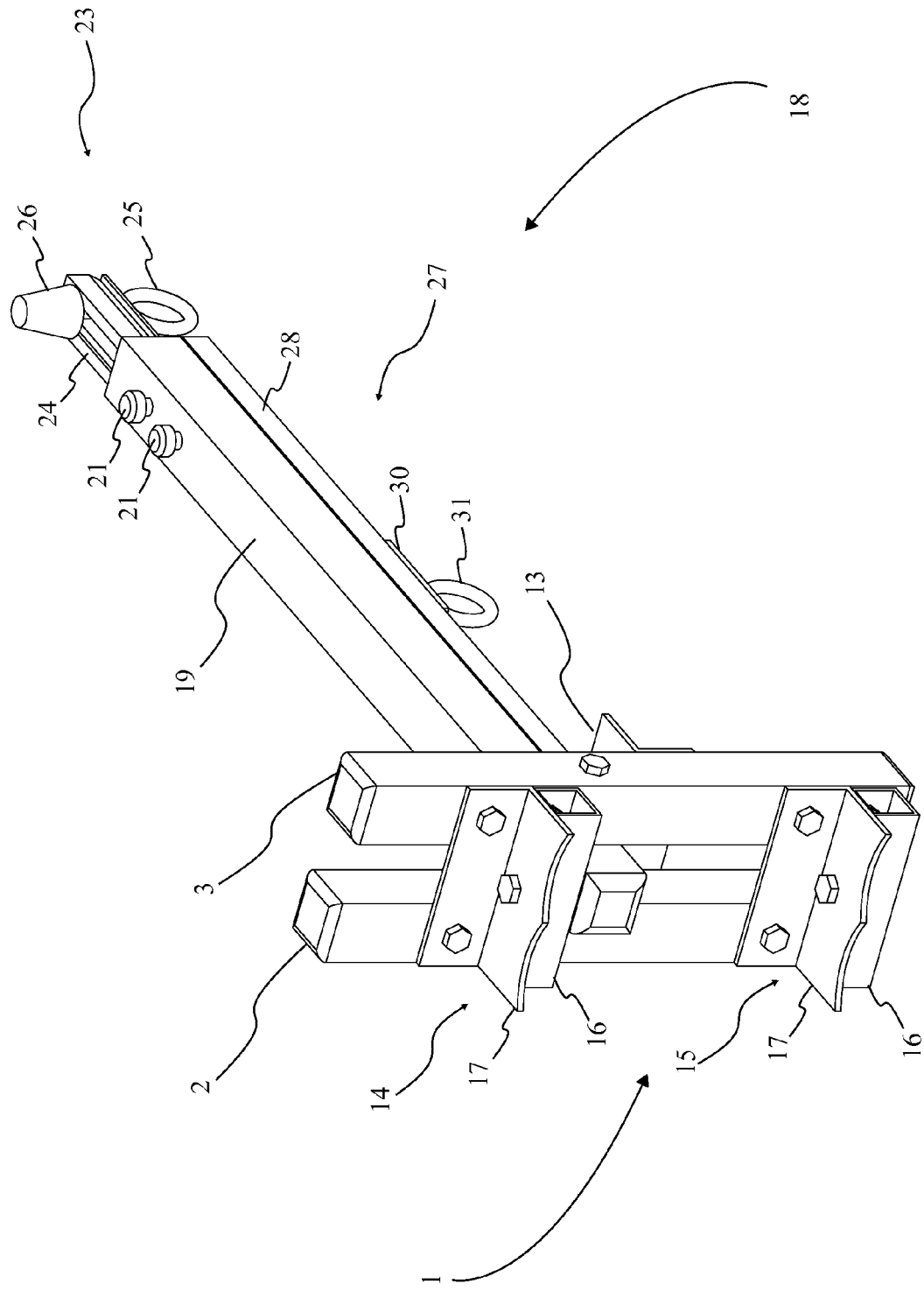
FIG. 8 is a rear perspective view displaying the telescoping boom hoist system arranged in use as per the current embodiment of the present invention.
Figure 9:
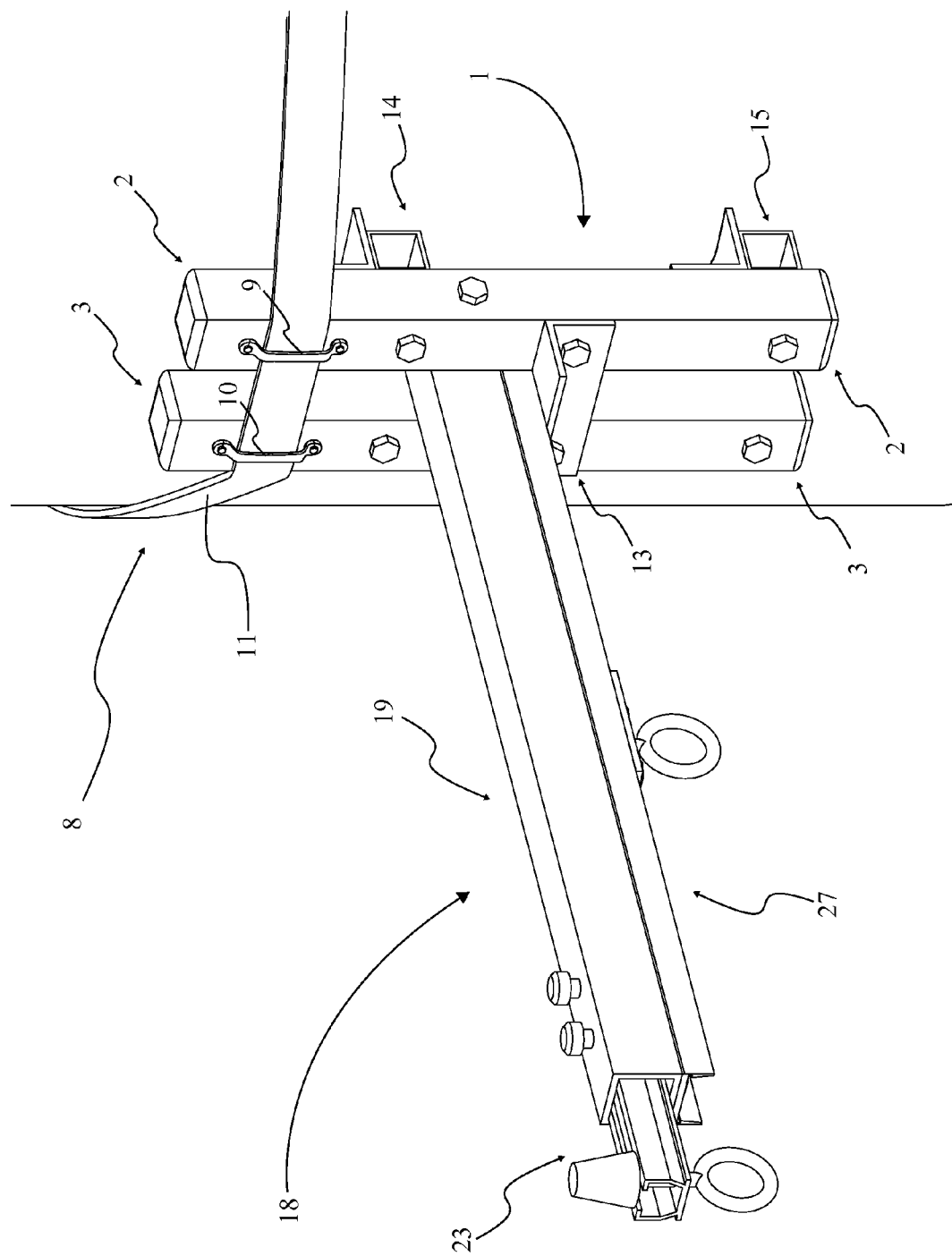
FIG. 9 is a front perspective view displaying the telescoping boom hoist system arranged in use and mounted to a tree as per the current embodiment of the present invention.
Figure 10:
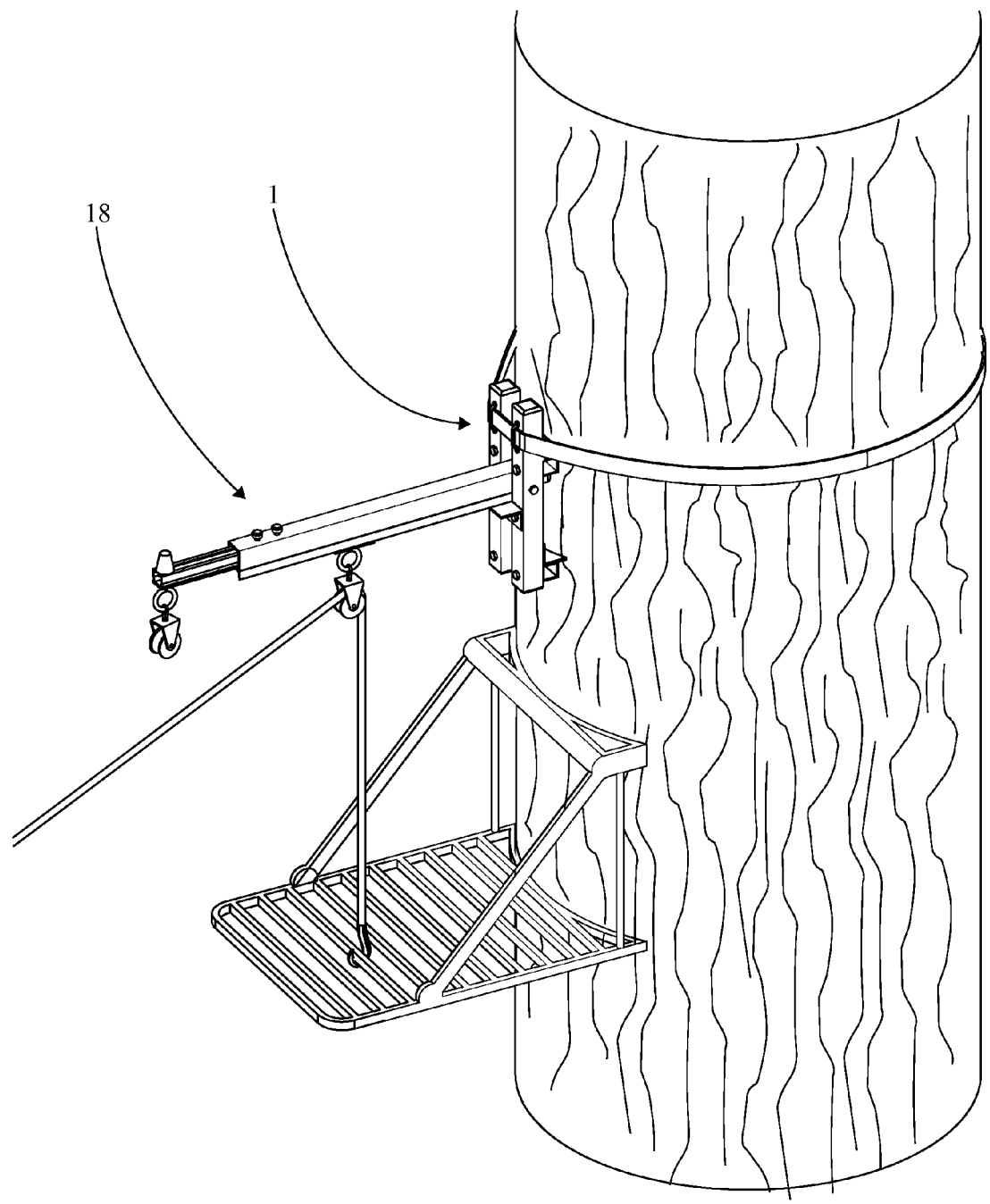
FIG. 10 is a front perspective view displaying the telescoping boom hoist system mounted to a tree while raising a hunting platform into position as per the current embodiment of the present invention.

Referencing FIG. 1 and FIG. 7, the telescoping boom hoist system utilizes the pivotable engagement between the frame assembly 1 and the telescopic boom 18 to arrange itself in a collapsed configuration. The collapsed configuration provides the present invention with a component arrangement that enables facilitated storage and transport when not in use. In the current embodiment of the present invention, when the telescoping boom hoist system is arranged in the collapsed configuration, the telescopic boom 18 pivots about the axis until becoming parallel with the first support 2 and the second support 3 of the frame assembly 1. With the length of the main section 19 resting parallel to both the first support 2 and the second support 3, the main section 19 is found positioned perpendicular to the claw plate 17 of the first anchor assembly 14. It should be noted that during the collapsed configuration, the strap 11 could retain its current positioning relative to the first strap guide 9 and the second strap guide 10 or be temporarily removed depending on user preferences or intended use of the present invention.

Figure 4:
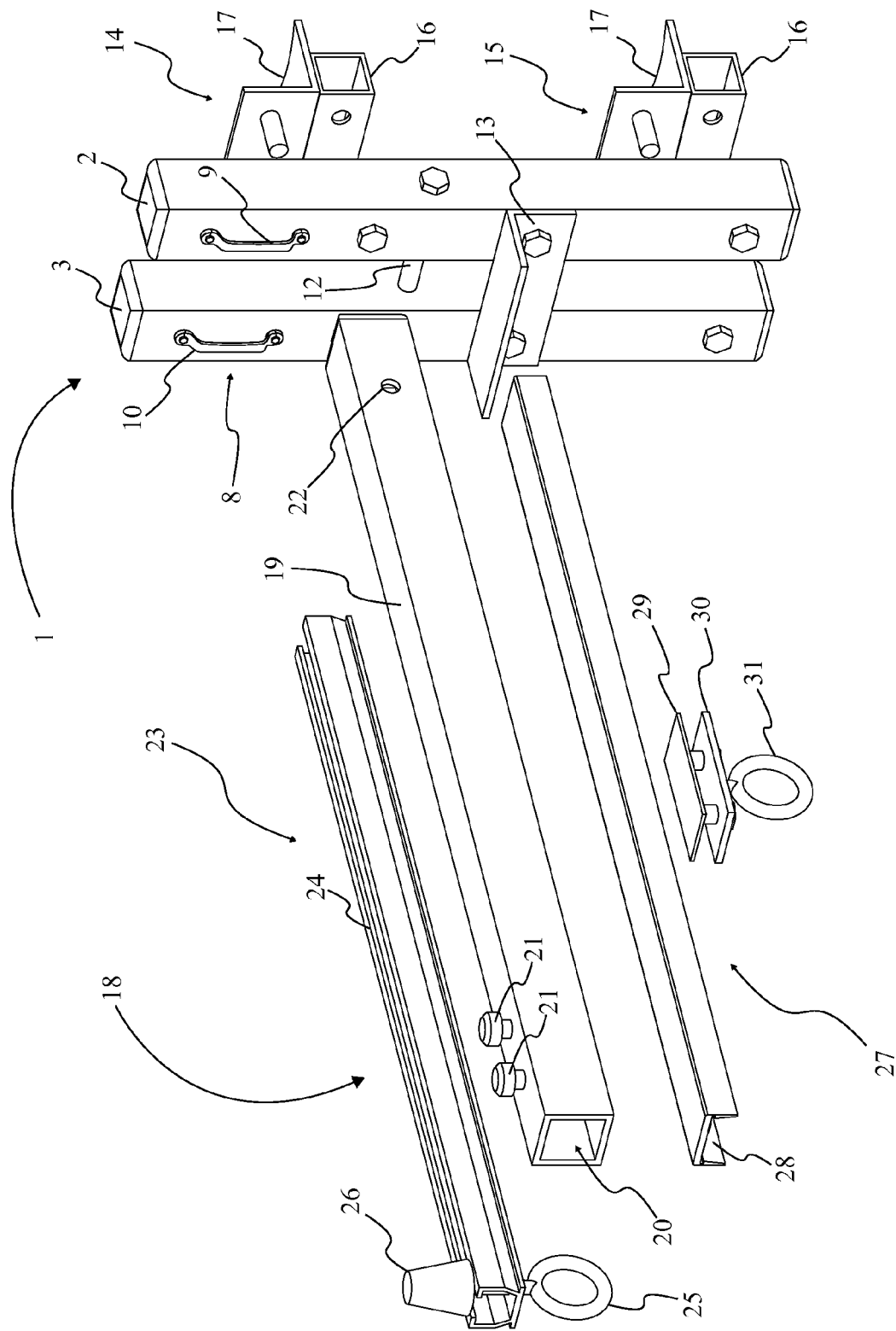
FIG. 4 is an exploded perspective view displaying the components of the frame assembly and the telescopic boom as per the current embodiment of the present invention.
Figure 5:
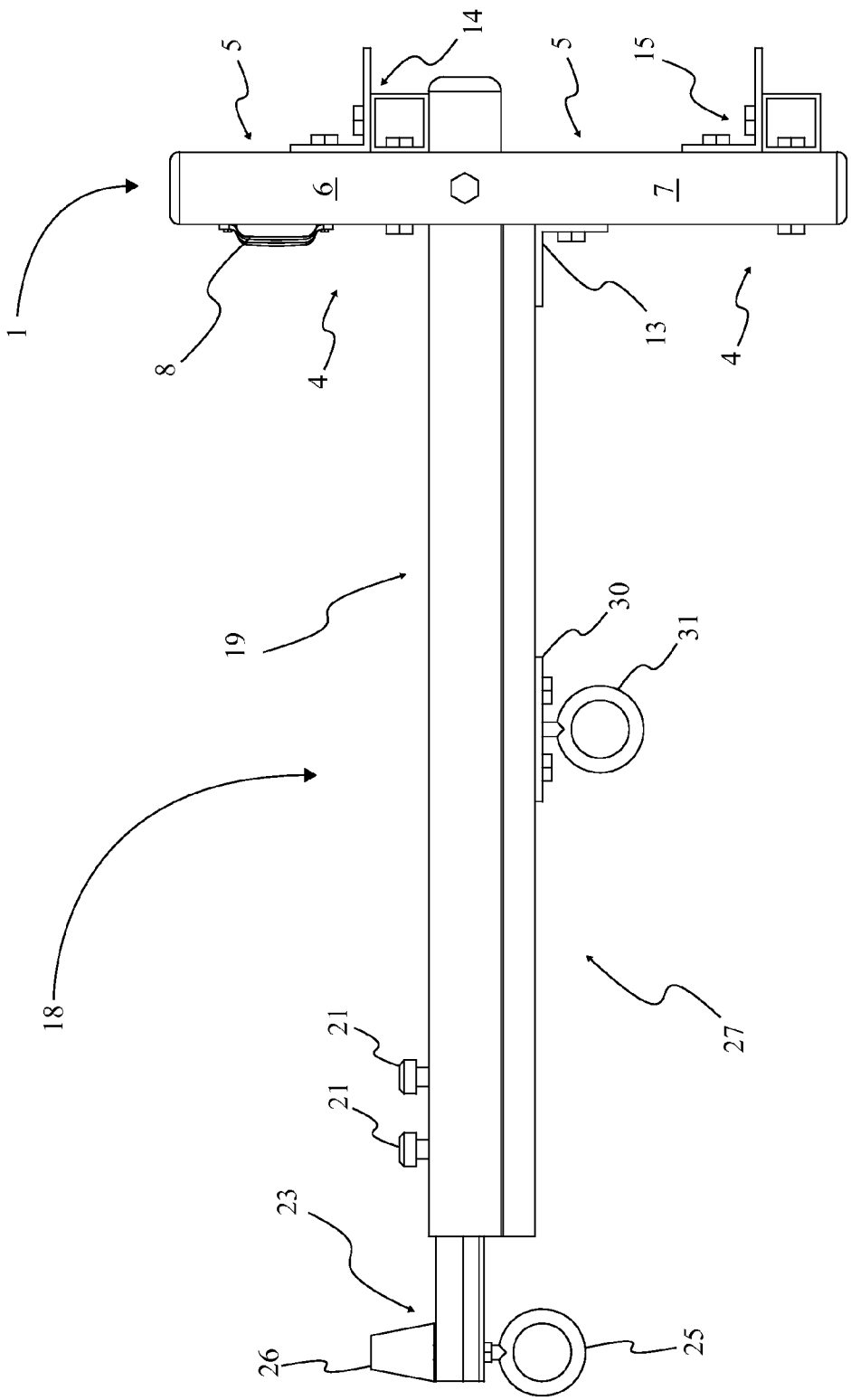
FIG. 5 is a lateral view displaying the components of the frame assembly and the telescopic boom as per the current embodiment of the present invention.
Figure 6:
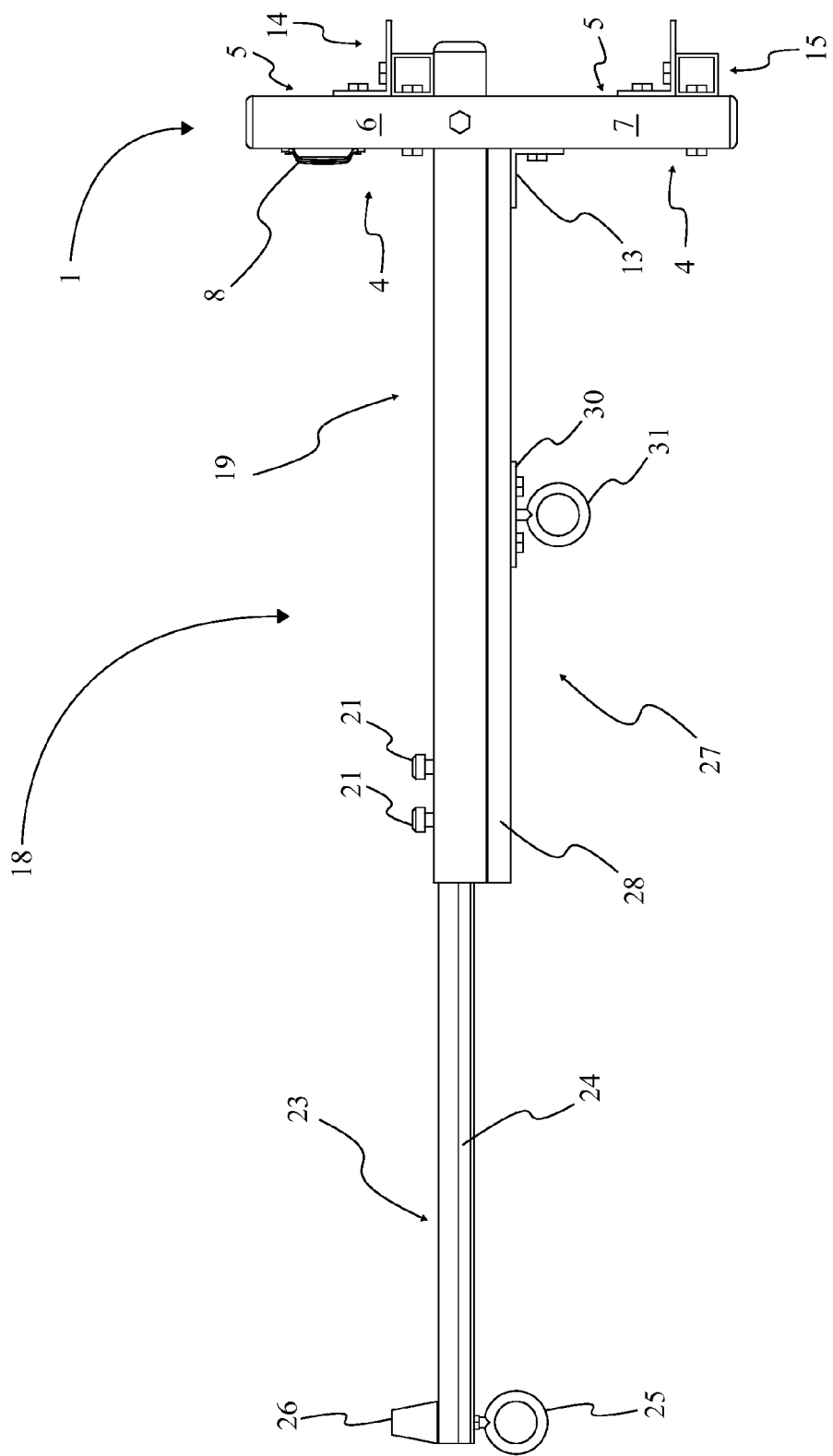
FIG. 6 is a lateral view displaying the components of the frame assembly and the telescopic boom, with the extended section protruding forward from the extension shaft as per the current embodiment of the present invention

Referencing FIGS. 4-6, the telescoping boom hoist system is provided with a particular component configuration for when it is in use. In the current embodiment of the present invention, when the telescoping boom hoist system is in use the telescopic boom 18 is found aligned perpendicular to the first support 2 and the second support 3. the perpendicular positioning provides the telescopic boom 18 to be found contra laterally retained to the base plate 13 and the support beam 16 of the first anchor assembly 14, wherein the main section 19 is found retained against the base plate 13 opposite a coincident engagement to the support beam 16 of the first anchor assembly 14 where both engagement are found opposite relative to the rotation about the axle 12. The contra lateral engagement prevents the telescopic boom 18 from rotating about the axle 12 once the main section 19 becomes coincident with the base plate 13 and the support beam 16 of the first anchor assembly 14. The contra lateral engagement distributes torque forces felt while hoisting to be distributed to the first support 2 and the second support 3 through the base plate 13 and the support beam 16 of the first anchor assembly 14.

Referencing FIGS. 1-4 and FIG. 10, in the current embodiment of the present invention, the telescoping boom hoist system is utilized to facilitate the raising and mounting of a hunting platform to a tree. The user would be provided with the present invention in a collapsed configuration, wherein the telescopic boom 18 would be positioned parallel to the positioning of the first support 2 and the second support 3. The user would ascend the side of a tree with the present invention collapsed and when the user determined an appropriate height was reached they would commence with mounting the present invention. The user would orient the present invention to have the first anchor assembly 14 and the second anchor assembly 15 facing the trunk of the tree. The user would also ensure that the frame assembly 1 is oriented in properly, wherein the lower region 7 of the first support 2 and the second support 3 would be directed towards the roots of the tree while the upper region 6 is oriented towards the top of the tree. After which, the user would engage the claw plate 17 of the first anchor assembly 14 and the second anchor assembly 15 with the side of the tree. The user would then utilize the at least one strap assembly 8 to secure the frame assembly 1 in place. The user would evenly wrap the strap 11 around the trunk of the tree, provided that the strap 11 is able to traverse the first strap guide 9 and the second strap guide 10. Prior to allowing the strap 11 to traverse the first strap guide 9 and the second strap guide 10, the user would permit the telescopic boom 18 to pivot into the in use position. The user would then traverse the strap 11 through the first strap guide 9 and the second strap guide 10 and then proceed to securely fasten the strap 11. With the at least one strap assembly 8 securing the frame assembly 1 in place, and the telescoping boom being in the in use position, the user would be able to attach a pulley or hoist to either the first guide ring 25 or the second guide ring 31. The attachment of a hoist or pulley is provided as an option for the user and it should be noted that the user could potentially utilize the first guide ring 25 or the second guide ring 31, as well as the combination of both in order to raise or hoist a platform into place. After mounting the hoist or a pulley, the user would then secure extended section 23 through the beam lock 21 or secure the second guide ring 31 through the use of the slide fastener 30. After securing the first guide ring 25 or the second guide ring 31, the user would utilize a length of cord to traverse through the hoist or pulley and attach the other end to the hunting platform. The user would engage the length of cord and raise the hunting platform into place. After which the user could utilize the telescoping boom hoist system to raise various accessories as needed.

The present invention is a telescoping boom hoist system comprising a frame assembly 1 and a telescopic boom 18. The frame assembly 1 is the base of the present invention, which serves as a mounting for the telescopic boom 18 as well as the anchor point to a tree. The frame assembly 1 comprises a first support 2, a second support 3, a plurality of anchor assemblies, a base plate 13, and at least one strap assembly 8. The first support 2 consists of a beam of some length with a square cross section. It should be noted that the exact size of the cross section and length of the beam are not explicitly described since the size and length would be understood as an obvious difference. The first support 2 utilizes a plurality of fastener holes which allow other components to be mounted to the first support 2. The exact positioning of the plurality of fasteners holes depends upon the exact number and position of the other components which are attached to the first support 2. The second support 3 is identical to the first support 2 in every way except positioning. The second support 3 is juxtaposed to the first support 2, wherein the second support 3 is positioned so distance away from the first support 2. The first support 2 and the second support 3 are connected together by the other components of the frame assembly 1.

The plurality of anchor assemblies are connected to the rear section 5 of both the first support 2 and the second support 3. The purpose of the plurality of anchor assemblies is to anchor the present invention to a tree. When the at least one strap assembly 8 is used to pull the present invention tightly up against a tree, the plurality of anchor assemblies dig slightly into the tree and thus provide a secure anchor point for the present invention. Each of the plurality of anchor assemblies comprise a claw plate 17 and a support beam 16. Additionally, each of the plurality of anchor assemblies contain a plurality of fastener holes. The claw plate 17 is in effect a standard L bracket which possesses a specifically shaped cut located at one end. The shape of the cut is what gives the claw plate 17 the ability to partially dig into the tree and thereby create a secure anchor point between the present invention and the tree. It should be noted the shaped cuts are ridges that contains peaks and valleys which permits each of claw plates 17 to partially penetrate the side of the tree.

The support beam 16 is located directly below the claw plate 17 and serves as an additional support for the claw plate 17 in order to prevent the claw plate 17 from becoming bent or damaged when engaged to the tree. The support beam 16 is attached to the claw plate 17 via a fastener. Alternatively, if the claw plate 17 and the support beam 16 are manufactured out of metal, the two components may be welded together. The plurality of fastener holes allow the anchor assemblies to be attached to the first support 2 and the second support 3 via a plurality of fasteners. Both the claw plate 17 and the support beam 16 posses several of the plurality of fasteners holes, thus allowing for maximum strength of connection between the plurality of anchor assemblies and both the first support 2 and the second support 3. The plurality of anchor assemblies are distributed vertically along the two supports to provide maximum connector strength between the present invention and the tree when the present invention is in use. The exact number of anchor assemblies used in the present invention may vary, however it is necessary that there be at least two anchor assemblies such that the present invention is sufficiently stabile when used.

The base plate 13 is positioned on the front section 4 of both the first support 2 and the second support 3. The base plate 13 further interconnects the first support 2 and the second support 3 and provides a flat horizontal surface on which the telescopic boom 18 rests. The telescopic boom 18 of the present invention is capable of rotating about an axle 12. The telescopic boom 18 is retained against a support bracket when resting on the base plate 13. It is necessary for the support bracket to ensure that the telescopic boom 18 remains in a horizontal position when the present invention is being used. The base plate 13 consists of an L shaped bracket that is spans some length. The exact length of the base plate 13 may vary in the final manufacturing of the present invention however it is desirable that the base plate 13 be at least the same in length as the overall width of the connected first support 2 and second support 3. Furthermore, the base plate 13 utilizes a plurality of fastener holes permitting the base plate 13 bracket to be connected to the first support 2 and the second support 3 via a plurality of fasteners.

The at least one strap assembly 8 allows the present invention to be attached to the tree by running either a tie down strap 11 or a rope through the first strap guide 9 and the second strap guide 10 and around the tree. Tightening the strap 11 or rope causes the anchor assemblies to dig into the tree and prevent the present invention from falling off of the tree. The first strap guide 9 and the second strap guide 10 prevent the strap 11 or rope used to secure the present invention to the tree from slipping off of the present invention which could cause the present invention to fall from the tree. The first strap guide 9 and the second strap guide 10 each comprise a small loop and a plurality of fastener holes. It should be noted that additional strap 11 assemblies may be utilized by the present invention and thus more than a single first strap guide 9 could be found present on the first support 2 as long as a complementary second strap guide 10 is encountered on the second support 3. it should be noted that while there present invention utilizes a first strap guide 9 and a second strap guide 10 for each of the strap 11 assemblies, that the exact number of strap 11 guides for every one strap 11 or rope used to attach the present invention to the tree must be at least two strap 11 guides, one on the first support 2 and one on the second support 3. Each of the strap 11 assemblies are connected to either the first support 2 or the second support 3 using a plurality of fasteners.

The telescopic boom 18 of the present invention is the component which allows the user to hoist either a tree stand or a hunting tool such as a gun or a bow up the tree. The telescopic boom 18 comprises a main section 19, an extended section 23, and an adjustable guide assembly 27. The main section 19 comprises a length of square tubing. The main section 19 is open at one end and closed at the other end. The main section 19 comprises an axle mount 22 which is located near the closed end of the main section 19. The purpose of the axle mount 22 is to allow the main section 19 to be attached to the frame assembly 1 in a manner such that the telescopic boom 18 is allowed to rotate relative to the frame assembly 1. The main section 19 is connected to the frame assembly 1 via an axle 12 which traverses through holes in both the first support 2 and the second support 3, and through the axle mount 22 of the main section 19. The axle mount 22 is some distance from the closed end of the main section 19 such that a small length of the main section 19 protrudes past the rotational link between the main section 19 and the frame assembly 1. When the main section 19 is in the horizontal position, a portion of the main section 19 comes into contact with the bottom of an anchor assembly specifically the support beam 16. This engagement prevents the telescopic boom 18 from rotating past to horizontal position, allowing the present invention to use the boom to project an anchor point away from the tree which the present invention is attached to. The purpose of allowing the telescopic boom 18 to rotate relative to the frame assembly 1 is to allow the present invention to fold up into a more streamlined configuration. In this collapsed configuration, it is much easier for the user to carry the present invention up the tree where it may be attached to the tree and utilized. The present invention is potentially even small enough to fit in a pocket when the user is climbing, thus greatly improving the easy of the use of the present invention. When the user reaches the desired height on the tree, they simply pull out the present invention and the telescopic boom 18 falls into the horizontal position by virtue of gravity and the present invention can then be easily attached to the tree.

An extended section 23 fits within an extension shaft 20 of the main section 19 allowing the present invention to extend an anchor point even further away from the tree. The extended section 23 is a structural beam of some cross sectional shape and some length. The exact length of the extended section 23 is not specified however it is most likely shorter than the length of the main section 19 since the extended section 23 is intended to fit within the main section 19. The extended section 23 is capable of sliding in and out of the main section 19 and can be seen in the extended position and in the retracted position in. The purpose of the extended section 23 is to allow the present invention to hoist a hunting tool up to the tree stand. Since the anchor point used to lift the tree stand is obscured by the presence of the tree stand on the tree, it is necessary to project an alternative anchor point out past the perimeter of the tree stand such that a rope and pulley system may be implemented to lift the hunting implement up to the tree stand. To generate the anchor point needed for this hoisting action, the extended section 23 further comprises a first guide ring 25. The first guide ring 25 is attached to the end of the extended section 23 and allows a rope and pulley system to be attached to the present invention for hoisting. The extended section 23 is connected to the main section 19 via a small plate which is overlapping with elements of the extended section 23. The small plate is moved via a pair of beam locks 21 which are located on the main section 19. Tightening the tightening beam locks 21 causes the small plate to come closer to the top surface of the main section 19, thus compressing the extended section 23 and preventing it from sliding. If the beam locks 21 are loosened, the small plate moves away from the top surface of the main section 19, thus freeing the extended section 23 and allowing it to slide.

The anchor point for hoisting the tree stand into position is created by the adjustable guide assembly 27 which slides back and forth within beneath the main section 19. The adjustable guide assembly 27 comprises a track 28 of some length which has a roughly U shaped cross section. The adjustable guide assembly 27 effectively serves as a channel for a slide mount 29, allowing the slide mount 29 to move back and forth along the length of the track 28 such that a second guide ring 31 for hoisting the tree stand can be positioned at an appropriate distance from the tree which the present invention is attached to. The slide mount 29 consists of a plate which fits within notches in the adjustable guide assembly 27. A slide fastener 30 is provided as a plate that is positioned some distance away from the slide mount 29 plate and is connected via a plurality of fasteners. The slide fastener 30 is a compression plate that is in direct contact with the lower sections of the track 28. Tightening the plurality of fastener compresses the slide fastener 30 and the slide mount 29 together preventing the slide mount 29 from moving along the track 28. The slide mount 29 is connected to the second guide ring 31 allowing for ropes and pulleys to be attached to the adjustable guide assembly 27, thus allowing for the tree stand to be hoisted up into position along the tree.

Although the invention has been explained in relation to its preferred embodiment, it is to be understood that many other possible modifications and variations can be made without departing from the spirit and scope of the invention as hereinafter claimed.

What is claimed is:

1. A telescoping boom hoist system comprises:
   a frame assembly;
   a telescopic boom;
   the frame assembly comprises a first support, a second support, at least one strap assembly, an axle, a base plate, a first anchor assembly, and a second anchor assembly;
   the telescopic boom comprises a main section, an extended section, and an adjustable guide assembly;
   the first support and the second support comprise a front section, a rear section, an upper region, and a lower region;
   the at least one strap assembly comprises a first strap guide, a second strap guide, and a strap;
   both the first anchor assembly and the second anchor assembly comprise a support beam having a square shaped cross section and an claw plate having an "L" shaped cross section;
   the main section comprises an extension shaft, a beam lock, and an axle mount;
   the extended section comprises an elongated beam, a stopper, and a first guide ring;
   the adjustable guide assembly comprises a track, a slide mount, a slide fastener, and a second guide ring; and
   said first support being oriented parallel to said second support;
   said axle comprises a rod interconnecting and oriented perpendicular to said first and second supports;
   said rod passing through said axle mount enabling said main section to pivot about said axle;
   said base plate comprising a beam having an "L" shaped cross section being perpendicularly affixed to said first and second supports, said base plate positioned to abut against said main section when said main section is oriented perpendicular to said first and second supports;
   said first and second anchor assemblies being perpendicularly affixed to said first and second supports and positioned opposite to said base plate;
   said strap guides being affixed to said first and second supports;
   said strap is adapted to pass through said strap guides and encircle a tree; and
   said first and second anchor assemblies are adapted to contact said tree when said strap encircles said tree.

2. The telescoping boom hoist system as claimed in claim 1 comprises:
   the at least one strap assembly being perpendicularly engaged with the front section;
   the at least one strap assembly being positioned on the upper region;
   the first strap guide being centrally aligned with the second strap guide;
   the first strap guide and the second strap guide being traversed by the strap;
   the support beam being perpendicularly coupled to the first support and the second support;
   the claw plate being peripherally coupled to the support beam; and
   the claw plate being positioned perpendicular to the rear section.

3. The telescoping boom hoist system as claimed in claim 1 comprises:
   the elongated beam being extendably positioned within the extension shaft;
   the elongated beam being selectively secured to the extension shaft by way of the beam lock;
   the first guide ring and the stopper being terminally positioned on the elongated beam;
   the first guide ring being positioned opposite the stopper on the elongated beam; and
   the first guide ring being fastenably attached to the elongated beam and the stopper.

4. The telescoping boom hoist system as claimed in claim 1 comprises:
   the adjustable guide assembly being coupled longitudinally to the main section;
   the track being positioned parallel to the extension shaft;
   the slide mount being moveably engaged to the track;
   the second guide ring being attached to slide mount by way of the slide fastener; and
   the slide mount being immovably retained to the track by way of the slide fastener.

5. The telescoping boom hoist system as claimed in claim 1 comprises:
   the telescopic boom being positioned between the first support and the second support;
   the main section being pivotably coupled to the axle by way of the axle mount;
   the telescopic boom being pivotably positioned between the first anchor assembly and the base plate;
   the extension shaft traverses centrally into the main section; and
   the beam lock being positioned coincident with the extension shaft.

6. The telescoping boom hoist system as claimed in claim 5 comprises:
   the telescopic boom being aligned parallel to the first support and the second support; and
   the main section being positioned perpendicular to the claw plate.

7. The telescoping boom hoist system as claimed in claim 5 comprises:
   the telescopic boom being aligned perpendicularly to the first support and the second support; and
   the telescopic boom being contra laterally retained to the base plate and the support beam of the first anchor assembly.

8. A telescoping boom hoist system comprises:
   a frame assembly;
   a telescopic boom;
   the frame assembly comprises a first support, a second support, at least one strap assembly, an axle, a base plate, a first anchor assembly, and a second anchor assembly;
   the telescopic boom comprises a main section, an extended section, and an adjustable guide assembly;
   the first support and the second support comprise a front section, a rear section, an upper region, and a lower region;
   the at least one strap assembly comprises a first strap guide, a second strap guide, and a strap;

both the first anchor assembly and the second anchor assembly comprise a support beam having a square shaped cross section and an claw plate having an "L" shaped cross section;
the main section comprises an extension shaft, a beam lock, and an axle mount;
the extended section comprises an elongated beam, a stopper, and a first guide ring;
the adjustable guide assembly comprises a track, a slide mount, a slide fastener, and a second guide ring;
said first support being oriented parallel to said second support;
said axle comprises a rod interconnecting and oriented perpendicular to said first and second supports;
said rod passing through said axle mount enabling said main section to pivot about said axle;
said base plate comprising a beam having an "L" shaped cross section being perpendicularly affixed to said first and second supports, said base plate positioned to abut against said main section when said main section is oriented perpendicular to said first and second supports;
said first and second anchor assemblies being perpendicularly affixed to said first and second supports and positioned opposite to said base plate;
said strap guides being affixed to said first and second supports;
said strap is adapted to pass through said strap guides and encircle a tree;
said first and second anchor assemblies are adapted to contact said tree when said strap encircles said tree;
the at least one strap assembly being perpendicularly engaged with the front section;
the at least one strap assembly being positioned on the upper region;
the first strap guide being centrally aligned with the second strap guide;
the first strap guide and the second strap guide being traversed by the strap;
the support beam being perpendicularly coupled to the first support and the second support;
the claw plate being peripherally coupled to the support beam; and
the claw plate being positioned perpendicular to the rear section.

9. The telescoping boom hoist system as claimed in claim 8 comprises:
the elongated beam being extendably positioned within the extension shaft;
the elongated beam being selectively secured to the extension shaft by way of the beam lock;
the first guide ring and the stopper being terminally positioned on the elongated beam;
the first guide ring being positioned opposite the stopper on the elongated beam;
the first guide ring being fastenably attached to the elongated beam and the stopper;
the adjustable guide assembly being coupled longitudinally to the main section;
the track being positioned parallel to the extension shaft;
the slide mount being moveably engaged to the track;
the second guide ring being attached to slide mount by way of the slide fastener; and
the slide mount being immovably retained to the track by way of the slide fastener.

10. The telescoping boom hoist system as claimed in claim 8 comprises:
the telescopic boom being positioned between the first support and the second support;
the main section being pivotably coupled to the axle by way of the axle mount;
the telescopic boom being pivotably positioned between the first anchor assembly and the base plate;
the extension shaft traverses centrally into the main section; and
the beam lock being positioned coincident with the extension shaft.

11. The telescoping boom hoist system as claimed in claim 10 comprises:
the telescopic boom being aligned parallel to the first support and the second support; and
the main section being positioned perpendicular to the claw plate.

12. The telescoping boom hoist system as claimed in claim 10 comprises:
the telescopic boom being aligned perpendicularly to the first support and the second support; and
the telescopic boom being contra laterally retained to the base plate and the support beam of the first anchor assembly.

13. A telescoping boom hoist system comprises:
a frame assembly;
a telescopic boom;
the frame assembly comprises a first support, a second support, at least one strap assembly, an axle, a base plate, a first anchor assembly, and a second anchor assembly;
the telescopic boom comprises a main section, an extended section, and an adjustable guide assembly;
the first support and the second support comprise a front section, a rear section, an upper region, and a lower region;
the at least one strap assembly comprises a first strap guide, a second strap guide, and a strap;
both the first anchor assembly and the second anchor assembly comprise a support beam having a square shaped cross section and an claw plate having an "L" shaped cross section;
the main section comprises an extension shaft, a beam lock, and an axle mount;
the extended section comprises an elongated beam, a stopper, and a first guide ring;
the adjustable guide assembly comprises a track, a slide mount, a slide fastener, and a second guide ring;
said first support being oriented parallel to said second support;
said axle comprises a rod interconnecting and oriented perpendicular to said first and second supports;
said rod passing through said axle mount enabling said main section to pivot about said axle;
said base plate comprising a beam having an "L" shaped cross section being perpendicularly affixed to said first and second supports, said base plate positioned to abut against said main section when said main section is oriented perpendicular to said first and second supports;
said first and second anchor assemblies being perpendicularly affixed to said first and second supports and positioned opposite to said base plate;
said strap guides being affixed to said first and second supports;
said strap is adapted to pass through said strap guides and encircle a tree;
said first and second anchor assemblies are adapted to contact said tree when said strap encircles said tree;

the at least one strap assembly being perpendicularly engaged with the front section;
the at least one strap assembly being positioned on the upper region;
the first strap guide being centrally aligned with the second strap guide;
the first strap guide and the second strap guide being traversed by the strap;
the support beam being perpendicularly coupled to the first support and the second support;
the claw plate being peripherally coupled to the support beam;
the claw plate being positioned perpendicular to the rear section;
the elongated beam being extendably positioned within the extension shaft;
the elongated beam being selectively secured to the extension shaft by way of the beam lock;
the first guide ring and the stopper being terminally positioned on the elongated beam;
the first guide ring being positioned opposite the stopper on the elongated beam;
the first guide ring being fastenably attached to the elongated beam and the stopper;
the adjustable guide assembly being coupled longitudinally to the main section;
the track being positioned parallel to the extension shaft;
the slide mount being moveably engaged to the track;
the second guide ring being attached to slide mount by way of the slide fastener;
the slide mount being immovably retained to the track by way of the slide fastener;
the telescopic boom being positioned between the first support and the second support;
the main section being pivotably coupled to the axle by way of the axle mount;
the telescopic boom being pivotably positioned between the first anchor assembly and the base plate;
the extension shaft traverses centrally into the main section; and
the beam lock being positioned coincident with the extension shaft.

14. The telescoping boom hoist system as claimed in claim 13 comprises:
the telescopic boom being aligned parallel to the first support and the second support; and
the main section being positioned perpendicular to the claw plate.

15. The telescoping boom hoist system as claimed in claim 13 comprises:
the telescopic boom being aligned perpendicularly to the first support and the second support; and
the telescopic boom being contra laterally retained to the base plate and the support beam of the first anchor assembly.

* * * * *